Figure 1:
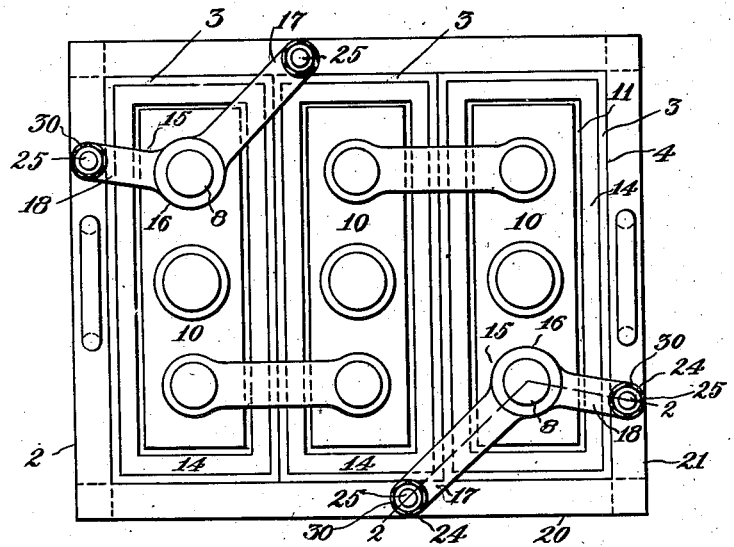

Feb. 15, 1927. 1,618,112

A. SETZER

STORAGE BATTERY

Filed March 2, 1923

Inventor:
Albert Setzer
By
Armington and White
Attorneys.

Patented Feb. 15, 1927.

1,618,112

UNITED STATES PATENT OFFICE.

ALBERT SETZER, OF PROVIDENCE, RHODE ISLAND.

STORAGE BATTERY.

Application filed March 2, 1923. Serial No. 622,260.

This invention relates to improvements in electrical storage batteries for use on motor cars, trucks, railway carriages or for other purposes.

One object of the invention is to provide an improved hold-down brace for holding the cells of the battery in place in their box or casing while bracing them from the sides thereof.

Another object of the invention is to provide a hold-down brace which not only secures the cells in position in their box but also stiffens and reinforces the box or casing itself.

Another object of the invention is to provide a brace which braces the terminal binding-posts of the battery from the sides of the box and also secures the electrodes against play or movement in the cells.

Another object of the invention is to provide a hold-down brace which may be employed for clamping the covers to the cells and also for compressing a sealing gasket against the joints between the edges of the covers and the walls of the cells.

Figure 2:
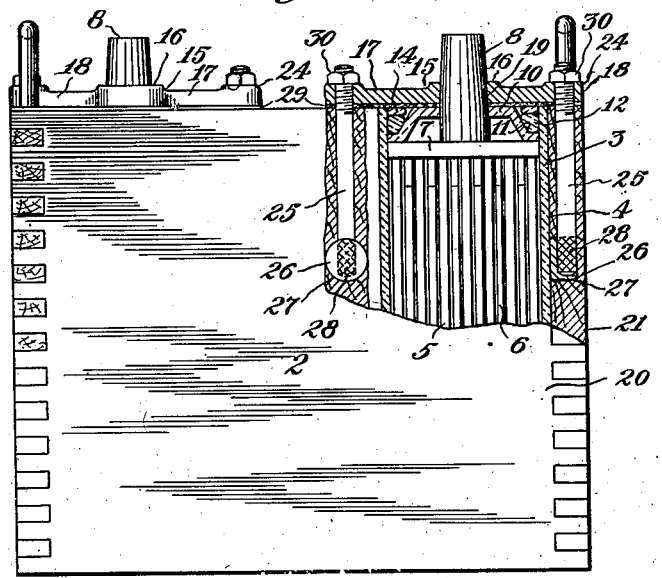
Figure 3:
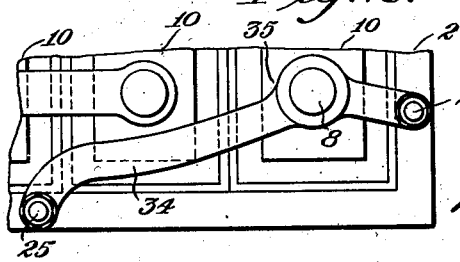

Further objects of the improvement are set forth in the following specification which describes a preferred embodiment of the invention as illustrated in the accompanying drawings. In the drawings:

Fig. 1 is a plan view of a battery showing my improved hold-down brace as applied to use thereon;

Fig. 2, a side elevation of the battery in part section on the line 2—2 of Fig. 2; and Fig. 3, a plan view of a portion of a battery illustrating a modified form or construction of the hold-down brace. Referring to Figs. 1 and 2 of the drawings, which illustrate a complete battery with my improvements applied thereto, 2 designates the outer wooden box or casing and 3 the cells contained therein. The units or cells 3 of the battery may be of any desired number and comprise relatively narrow jars 4 constructed of hard rubber or similar dielectric material capable of resisting the action of the acid of the electrolyte contained therein. The jars 4 are usually of rectangular shape adapted to fit snugly within the sides of the box 2 in abutting relation as shown in Fig. 1. Each cell contains opposite series of positive and negative plates or grids 5 and 6 which are connected at the top by horizontal pillar-straps 7 having terminal binding-posts 8 projecting upwardly therefrom.

The jars 4 are closed at the top by covers 10 and the improved method of sealing the joints between the edges of the covers and the walls of the jars constitutes an important feature of the present invention. Referring particularly to Fig. 2, the covers 10 are arched upwardly at the center to provide depressions 11 surrounding their marginal edges and adapted to receive the sealing-means, the depressed portions of the covers 10 being seated against the top of the pillar-straps 7 which form a rest therefor. As a feature of my improved sealing-means 1 employ a relatively thick, resilient gasket-ring 12 adapted to seat in the depression 11 to surround the outer edges of the cover. The ring or gasket 12 may conveniently be of cylindrical shape in cross-section, and is adapted to be compressed to crowd it into the confines of the tapered recess 11 whereby it will tightly seal the joint between the edges of the cover 10 and the walls of the jar 4. The gasket 12 may be of soft rubber or similar yielding and compressible material not affected by acid.

Preferably, I place a relatively flat and stiffer secondary gasket 14 on top of the gasket 12, the shape of which is rectangular in plan view, see Fig. 1, to adapt it to conform to the shape of the cover 10. The gasket 14 serves as the holding or compression-element for the expansible gasket 12 and may conveniently be constructed of vulcanized rubber or fiber.

For clamping the compression-gasket 14 against the sealing-gasket 12 to bind the cover against the rest or pillar-strap 7, while sealing its joint with the jar 4, I make use of a hold-down brace 15 which is fastened to the sides of the outer box 2. In its preferred form the brace 15 consists of a strap or clamp-like element, constructed of vulcanized rubber or lead alloy, and provided with a hub 16 having two or more arms 17 and 18 projecting therefrom. The hub 16 is bored at 19 to adapt it to fit over the terminal post 8 which projects upwardly through an opening in the cover 10, and the arms 17 and 18 reach outwardly therefrom to adapt their ends to overlie the upper edges, respectively, of the side and end strips 20 and 21 of the box or casing 2. At the ends of the arms 17 and 18 are bosses 24 for receiving the ends of screw-threaded rods or bolts 25 by means of which the brace is clamped to the box 2.

As shown more particularly in Fig. 2, the rods or bolts 25 are inserted in vertical bores in the side and end strips or boards 20 and 21 of the box 2, and are anchored in place at their lower ends. As an anchoring or fastening means for the bolts I preferably employ cylindrical plugs 26 of lead or other fusible material let into circular bores 27 on the sides of the box and consolidated with the ends of the bolts. The lower ends of the bolts 25 are knurled or scored at 28 and the melted lead is poured into the openings 27 in the wooden box 2 to fuse it around the bolts whereby to form a secure and permanent anchorage therefor.

After the jars 4 have been placed in the box 2 and the covers 10 fitted thereto, with their recessed portions resting on the pillar-straps 7, the expansible gaskets 12 are inserted in the recesses 11 and the rigid gaskets 14 fitted thereover. The hubs 16 of the braces 15 are then slipped over the binding-posts 8 and, preferably, a relatively thin and pliable cushioning gasket 29 is placed beneath each brace to bear against the top of the cover 10. The bosses 24 at the ends of the arms 17 and 18 of the braces 15 receive the threaded ends of the bolts or rods 25, and suitable nuts 30 are placed thereon and screwed down against the bosses to clamp the braces in place. This clamping action acts first to force the upper gaskets 14 against the compressible gaskets 12 to squeeze the latter into the bottom of the tapered recesses 11, whereby the material of the gaskets is tightly compressed against the inner walls of the jars 4 to effectually seal the joint between the edges of the covers and the sides of the jars. The covers 10 will thus be seated firmly against the top of the rests or pillar-straps 7 and sealed to the rims of the jars to prevent the escape of the electrolyte liquid which has practically no disintegrating effect on the rubber employed in the construction of the seal.

In this way a permanent, acid-proof seal is effected and the covers 10 are securely held in place on the jars 4, while providing for their convenient removal in case it is required to inspect or remove the grids 5 and 6 from the cells for repair or replacement. It is also to be observed that the braces 15 serves further to hold the cells down in the box or casing 2, while bracing them from the sides and ends thereof to prevent them from shifting or weaving laterally and longitudinally therein. Moreover, the terminal posts 8 are braced and supported from the side and ends of the box to resist the pull and strain of the conductor-cables which are united thereto in connecting the battery for use. This reinforcement of the posts from the box also prevents movement or play of the electrodes or grids connected therewith; and in addition the box or casing itself is braced and reinforced at its weakest points, the corners.

It is to be noted that the longer arm 17 of each brace extends across and overlies the corners of two cells so that the two braces hold down the covers of all of the several jars in the box. In other cases I may employ a modified form of brace or hold-down which by itself is designed to overlie and fasten down the covers of all of the several cells in the box. Such a modified form of the invention is illustrated in Fig. 3 in which one arm 34 of the brace 35 is extended to reach across the top of all the cells in the box, the brace for the opposite side of the battery being constructed of similar shape to hold down the covers 10 at their opposite ends.

While I have herein illustrated and described my improved device in its preferred form, it will be obvious that various modifications may be made in its construction and arrangement without departing from the spirit or scope of the invention. An essential feature of the improvement, however, consists in fastening the brace to at least two sides of the box or casing of the battery and arranging it to overlie two or more cells therein for the purposes above set forth. Without, therefore, limiting myself to the exact structure of the parts of the device as disclosed, I claim:

1. In a storage battery, the combination with an outer box or casing, of cells contained within the box, terminal posts projecting upwardly from the cells, a hub secured to a terminal post and having arms extending radially therefrom across a corner of the box, and means to secure one of the arms to the end of the box and another arm to the side of the box to hold the cells within the box while bracing the latter across its corners to prevent pulling away of its sides and ends.

2. In a storage battery, the combination with an outer box or casing, of a plurality of cells contained therein, terminal posts projecting upwardly from the cells, hubs secured to said posts and having a plurality of arms projecting therefrom across the top of the cells, and means to fasten one arm to the side of the box and another arm to the end of the box to clamp the cells therein while bracing them from at least two sides of the box and also bracing and reinforcing the box across its corners.

3. In a storage battery, the combination with an outer box, of a plurality of cells contained therein, terminal posts projecting upwardly from said cells, hubs secured to said posts and provided with a plurality of arms with one of said arms extended to reach across a plurality of the cells, and means for fastening one arm to the side of the box and the other arm to the end of the box to hold the cells in place therein while bracing the box across its corners to prevent the sides and ends from pulling part or spreading.

4. In a storage battery, the combination with an outer box, of a plurality of cells contained therein, terminal posts projecting upwardly from the cells, braces connected to said posts and extending across the upper edges of the box, bolts projecting downwardly from the braces into vertical bores in the sides of the box, and fastening means inserted through openings in the sides of the box to engage with the ends of the bolts to anchor them in their bores.

5. In a storage battery, the combination with an outer box or casing, of a plurality of jars arranged in adjacent relation therein, covers on said jars, terminal posts projecting upwardly from the jars through the covers, hold-down braces having hubs surrounding the posts with a plurality of arms extending from opposite sides thereof across the covers on the jars, and means to secure the end of one arm to the end of the box and the end of another arm to the side of the box to hold the jars therein and brace them in two directions while reinforcing the corners of the box.

6. In a storage battery, the combination with a box or casing, of a plurality of jars contained therein, covers on said jars, terminal posts projecting upwardly from the jars through the covers, braces connected to said posts and provided with a plurality of arms extending in opposite directions across the top of the covers and overlapping the edges of the sides and ends of the box, a gasket between the braces and the covers of the jars, and means to fasten the braces to the sides and ends of the box to clamp the covers in place on the jars while bracing the jars from the box.

7. In a storage battery, the combination with an outer box or casing, of a plurality of jars contained therein, covers on the jars, terminal posts projecting upwardly from the jars through the covers, braces having hubs connected to the posts and provided with a plurality of arms extending across the covers of the jars to overlap both the sides and ends of the box, bolts extending through holes in the braces and anchored to the sides of the box, and nuts on the bolts adapted to clamp the braces against the covers to bind them to the jars while also acting to brace the jars from the box.

8. In a storage battery, the combination with an outer box or casing, of a plurality of jars contained therein, covers having recessed edges fitted within the tops of the jars, rests in the jars against which the covers seat, compressible gaskets arranged in the recesses of the covers overlapping their joints with the sides of the jars, terminal posts projecting upwardly from the jars, braces having hubs fastened to said posts and provided with a plurality of arms extending across the top of the covers and overlapping the sides and ends of the box, and means to fasten the braces to the sides and ends of the box to clamp them against the gaskets to expand the latter to seal the joints between the jars and their covers while also acting to hold the covers in place on the jars and to brace the jars from the box.

9. In a storage battery, the combination with an outer box or casing, of a plurality of jars contained therein, electrodes within the jars, pillar-straps connecting the electrodes, covers fitted within the jars to rest on the pillar-straps and provided with recessed portions abutting the inner walls of the jars, terminal posts projecting upwardly from the pillar-straps through the covers, compressible gaskets in the recesses of the covers overlapping the joints between the covers and the jars, braces having hubs connected to the terminal posts and provided with a plurality of arms extending across the top of the covers, and means to clamp the opposite arms of the braces to the sides and ends of the box to bind the covers against the pillar-straps while also compressing the gaskets in the recesses of the covers to seal the joints between the covers and the jars.

10. A storage battery including a case, anchors secured in the sides and ends of the case and upstanding therefrom, anchor bars connected at their respective ends to said side and end anchors, said bars being also connected to the plates of the battery cells and electrical conductors connected to said bars.

In testimony whereof I affix my signature.

ALBERT SETZER.